United States Patent [19]
Levy

[11] Patent Number: 6,064,727
[45] Date of Patent: May 16, 2000

[54] METHOD AND APPARATUS FOR MAINTAINING UNINTERRUPTED TELECOMMUNICATIONS SERVICE

[75] Inventor: Robert Bergman Levy, Branchburg, N.J.

[73] Assignee: AT&T Corp, New York, N.Y.

[21] Appl. No.: 09/167,113

[22] Filed: Oct. 6, 1998

[51] Int. Cl.[7] .................................................. H04M 3/00
[52] U.S. Cl. ............................................ 379/221; 370/237
[58] Field of Search .............................. 379/221; 348/6; 455/5.1; 370/237

[56] References Cited

U.S. PATENT DOCUMENTS

| | | | |
|---|---|---|---|
| 5,608,446 | 3/1997 | Carr et al. ..................................... | 348/6 |
| 5,661,792 | 8/1997 | Akinpelu ................................. | 379/221 |
| 5,675,577 | 10/1997 | Komatsu ............................. | 379/221 X |
| 5,774,527 | 6/1998 | Handelman et al. ................. | 379/93.07 |

OTHER PUBLICATIONS

US Patent Application Serial No. 08/671745, Filing Date Jun. 28, 1996 (Buhrmann 7–3).
US Patent Application Serial No. 08/768371, Filing Date Dec. 17, 1996 (Buhrmann 8–6).
US Patent Application Serial No. 08/644027, Filing Date May 9, 1996 (Amin 2–5).

*Primary Examiner*—Creighton Smith
*Attorney, Agent, or Firm*—Robert B. Levy

[57] ABSTRACT

A subscriber receives substantially uninterrupted telecommunications service at a station set (12) by virtue of a connection between the set and a telephone facility (20) via a preferred communications channel (14) and an alternate communications channel (16). First and second intelligent switching means (44, 46) are associated with the subscriber station set and with the telecommunications facility (20), respectively. The first and second intelligent switching means route calls from the station set and the telephone facility to the telephone facility and station set, respectively, based on the availability of the first and second communications channels and on the characteristics of the call.

8 Claims, 1 Drawing Sheet

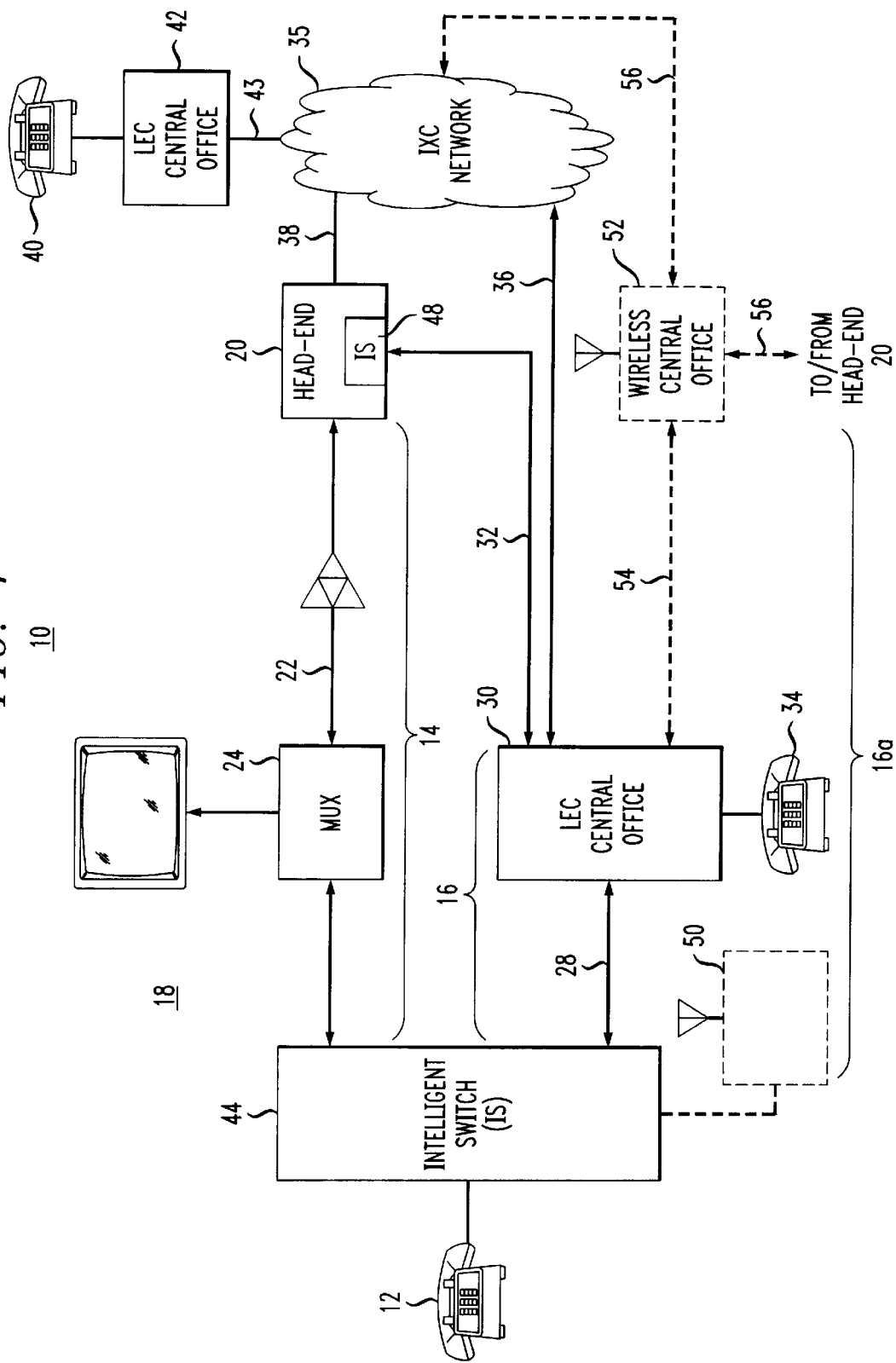

METHOD AND APPARATUS FOR MAINTAINING UNINTERRUPTED TELECOMMUNICATIONS SERVICE

TECHNICAL FIELD

This invention relates to a technique for providing a subscriber of telecommunications with uninterrupted service.

BACKGROUND ART

Presently, most residential and small business telephone subscribers receive service (i.e., dial tone) from a Local Exchange Carrier, typically via a pair of wires extending between the subscriber's residence or business and a local loop, either a central office, or an intermediate facility, such as a subscriber loop carrier. The wire pair (often referred to as a "line") running to the subscriber's premises not only carry voice and/or data, but also carry a constant voltage to power the subscriber's station set. Virtually all Local Exchange Carriers maintain extensive battery plants and/or auxiliary power generation equipment for maintaining the voltage on the subscriber's line in the event of a power failure. For that reason, local telephone service often continues to operate notwithstanding the lack of electrical power to the subscriber's premises. Many subscribers have grown accustomed to the high degree of reliability of traditional telecommunication service furnished by their Local Exchange Carrier.

The deployment of bi-directional cable television networks now affords the opportunity for subscribers served by such networks to obtain telecommunications services from their cable television service provider rather than their Local Exchange Carrier. Indeed, the high bandwidth afforded by the coaxial cable deployed by cable television service providers in their cable plant allows such service providers to offer a variety of enhanced telecommunications services not all of which are available to all subscribers served by a Local Exchange Carrier.

Presently, telecommunication service over a cable television transmission path requires certain equipment at the subscriber's premises, such as a multiplexer, to multiplex the telecommunications onto and off the transmission path. For the most part, such equipment requires external power that is obtained from the AC electrical service at the subscriber's premises. Unfortunately, such equipment will likely become inoperative in case of a power failure, resulting in a loss of telecommunications service. Moreover, even if the equipment at the subscriber premises for providing telecommunications over the cable television transmission path remains operative, other equipment in the cable television plant, such as trunk and line amplifiers, that lack standby power, may become inoperative in the event of a power failure, thus interrupting service.

Despite the potential service offerings available with telecommunications over cable television, subscribers have declined such service in favor of the more reliable telecommunication service offered by their Local Exchange Carrier. Thus, there is a need for a technique for providing uninterrupted telephony service that takes advantage of the benefits afforded by alternative mediums, such as cable television or the like, yet affords high reliability.

BRIEF SUMMARY OF THE INVENTION

Briefly, the present invention comprises a method for providing substantially uninterrupted telecommunications service between a subscriber's station set and a telecommunications facility linked via a preferred communications channel of a first type and an alternate communications channel of a second type having separate transmission characteristics. For example, the preferred communications channel may comprise a cable television transmission path (e.g., a coaxial cable) carrying telecommunications traffic in addition to cable televisions signals. The alternate communications channel may comprise a pair of metallic wires that carry traditional telephone service provided by a Local Exchange Carrier. A call destined between the station set and the telecommunications facility is examined to determine the call characteristics, such as the dialed number for example. In addition, the preferred and alternate communication channels are monitored to determine their availability. The characteristics of the call as well as the availability of the preferred and alternate communications channels determine the routing of the call between the telecommunications facility and the subscriber station set. As long as the preferred channel is available, and the characteristics of the call render it best suited for that channel, then the call is routed on the preferred communications channel between the subscriber's station set and the telecommunications facility. Thus, for example, an inter-exchange call originated at the subscriber's station set passes on the preferred communications channel when that channel comprises a cable television transmission path available to carry telecommunications traffic. Typically, the telecommunications facility (e.g., the head end of the cable television system) receiving the call from the subscriber's premises over the preferred communications channel usually enjoys a direct link to an Inter-Exchange Carrier. In this way, access charges for the call are avoided. Conversely, a local call originated at the subscriber's station set, and destined for a called party served by the Local Exchange Carrier, is best routed over the alternate communications channel even though the preferred channel is available, because routing via the Local Exchange Carrier avoids separate access charges.

Reliability is enhanced with the method of the invention because two separate communications channels connect the subscriber's station set to the telecommunications facility. In the event either channel becomes unavailable, calls can be routed over the other channel.

BRIEF DESCRIPTION OF THE DRAWING

FIG. 1 is a block schematic diagram of a telecommunications network in accordance with the invention.

DETAILED DESCRIPTION

FIG. 1 illustrates a telecommunications network 10 in accordance with a preferred embodiment of the invention for providing substantially uninterrupted telephone service to a subscriber's station set 12. In the illustrated embodiment, the station set 12 comprises a conventional analog voice telephone set, although the station set could take other forms, such as a multimedia terminal or a fax machine, for example. To enjoy substantially uninterrupted service in accordance with the invention, a subscriber may initiate as well as receive calls at a station set 12 over a preferred communications channel 14 or, in case of its unavailability, an alternate channel 16, having separate transmission characteristics.

In the preferred embodiment, the preferred channel 14 comprises a cable television communications path that carries telecommunication service and conventional cable television service between a subscriber's premises 18 and a cable television head end 20. The cable path includes a bi-directional coaxial cable network 22 (shown as a single cable and an amplifier 23) that carries signals between the head end 20 and a multiplexer 24 at the subscriber's premises 18. The multiplexer 24 separates the telephony signals from the cable television signals, the latter supplied by the multiplexer to one or more television sets 26 (only one of which is shown). The head end 20 includes similar multiplexer (not shown) for multiplexing telecommunications signals onto and off the cable network 22.

In the preferred embodiment, the alternate communications channel 16 comprises a metallic wire pair 28 running between the subscriber's premises 18 and a Local Exchange Carrier (LEC) central office 30. (Rather than connect the subscriber's premises 18 to the LEC central office 30, the metallic wire pair 28 could connect the subscriber's premises 18 to a Subscriber Loop Carrier (SLC) system connected to the LEC central office via a fiber optic cable (not shown)). The metallic wire pair 28 not only carries voice telephony signals, but also carries a DC voltage useful for powering the station set 12.

A trunk 32 connects the LEC central office 30 to the head end 20. In this way, a local call originating at a station set 34 directly served by the LEC can pass to station set 12 over the preferred communications channel 14. The LEC central office 30 and the head end 20 can each route Inter-Exchange (IXC) calls to an IXC network, such as the IXC network 35 maintained by AT&T, via trunks 36 and 38, respectively. Upon receipt of an IXC call, such as a call destined for a station set 40 served via a LEC 42 in a different Local Access Telephone Area (LATA), the IXC network 35 routes the call to the LEC 42 via a trunk 43. The LEC 42 then routes the call to the station set 40.

To facilitate uninterrupted service, an intelligent switch (IS) 44 at the subscriber premises 18 routes calls originating at the telephone station set 12 over one of the preferred and alternate communication channels 14 and 16, depending on the characteristics of the call and the availability of the channels. In the illustrated embodiment of FIG. 1, the IS 44 couples the station set 12 to the multiplexer 24 and to the metallic wire pair 28 for routing calls over the cable television network 22 and over the metallic pair, respectively. The IS 44 typically comprises a microprocessor or a dedicated logic circuit that monitors the status of the preferred and alternate communications channels 14 and 16 and the characteristics of each call initiated from the station set 12. Based on the availability of the preferred and alternate communications channels 14 and 16, and the characteristics of the call, the IS 44 decides whether to route the call over the preferred or alternate communication channels.

In practice, the IS 44 preferentially routes calls over the preferred communications channel 14 as long as that path is available, unless the characteristics of the call make making routing over the alternate communications channel 16 desirable. For example, the IS 44 will typically route an IXC call initiated at the subscriber's station set 12 over the preferred communications channel 14 to the head end 20, as long as the preferred channel is available. The IS 44 preferentially routes IXC calls over the preferred communications channel 14 when that channel comprises the cable television network 22 because the head end 20 typically enjoys a direct connection to the IXC network 35 via trunk 38. In this way, an IXC call initiated at the subscriber set 12 and routed over the preferred communications channel 22 incurs no LEC access fees in contrast to an IXC call routed over the alternate communications channel 16 to the LEC 30 for routing to the IXC network 35.

The IS 44 also preferentially routes other types of calls initiated by the subscriber's station set 12 over the preferred communications channel 14. For example, the IS 44 will typically route data calls requiring high bandwidth or calls directed to nodal customers of the IXC 35 (customers that enjoy a direct connection to the IXC) over the preferred communications channel 14.

In the event that the preferred communications channel 14 is unavailable, the IS 44 then routes all calls initiated by the subscriber's station set 12 over the alternate communications channel 16. In this way, the IS 44 provides substantially uninterrupted service, especially when the alternate communications path 16 comprises a traditionally reliable communications channel, such as the metallic wire pair 28 providing LEC local service. In some instances, the IS 44 will also route calls over the alternate communications channel 16 even when the preferred communications channel 14 remains active. For example, the IS 44 will route a local call (i.e., a call directed to the station set 34 served by the LEC 30) over the alternate communications channel 16 rather than the preferred channel 14 to avoid local access charges. Calls that cannot be routed over the alternate communications channel 16 are typically blocked.

Like the subscriber premises 18, the head end 20 also includes an IS 48. The switch 48, configured generally in the same way as the IS 44, selectively routes calls received at the head end 20 over one of the preferred and alternate channels 14 and 16 to the subscriber's station set 12. Like the IS 44, the IS 48 monitors the status of the preferred and alternate channels 14 and 16, respectively, and preferentially routes calls over the preferred channel, if available as long as the characteristics of the call are best suited for that channel. Thus, for example, the IS 48 preferentially routes voice calls as well as high bandwidth data calls over the preferred communications channel 14, as long as that channel is available. If the channel is not available, then the IS 48 route calls over the alternate communications channel 16 to the subscriber's station set. Calls that cannot be routed over the alternate communications channel 16 are typically blocked.

Preferably, the alternate communications channel 14 comprises the metallic wire pair 28 through which the LEC 30 provides local service. In addition to its high reliability, the LEC local service provided by the alternate communications channel 16 would advantageously supply power to the IS switch 44 in case of a power failure. However, other types of communications mediums could be substituted for the metallic wire pair 28. For example, an alternate communications channel 16a (shown in phantom) could comprise a wireless channel provided by the combination of a wireless transceiver 50 at the subscriber premises 18 in communication with a wireless central office 52. Trunks 54, 56, and 58 connect the wireless central office to the LEC 30, the IXC network 35, and the head end 20, respectively.

Substitution of the wireless alternate communications channel 16a for the wired alternate communications channel 16 achieves generally the same operating characteristics as described above. Upon receipt of a call originating at the subscriber's premises 12, the IS 44 monitors the channels 14 and 16a and preferentially routes calls over the channel 14, provided that channel is available and is best suited for the characteristics of the call. Similarly, upon receipt at the head end 20 of a call destined for the subscriber set 12, the IS 48 monitors the availability of the channels 14 and 16a and the call characteristics. The IS 48 preferentially routes calls over the preferred communications channel 14, provided that channel is available and is best suited for the characteristics of the call. When the channel 14 is unavailable or when the call characteristics best match those of the channel 16a, then IS 44 and the IS 48 will route calls over the alternate channel.

The foregoing describes a technique for providing substantially uninterrupted telecommunications service.

The above-described embodiments merely illustrate the principles of the invention. Those skilled in the art may make various modifications and changes that will embody the principles of the invention and fall within the spirit and scope thereof.

What is claimed is:

1. A method for providing substantially uninterrupted telecommunications service between a subscriber's station set and a telecommunications facility coupled to the subscriber's station set via a preferred communications channel of a first type and an alternate communications channel of a second type having different transmission characteristics, the method comprising the steps of:

examining characteristics of a call at one of said station set and said telecommunications facility that is destined for the other of said station set and telecommunications facility to determine, based on said characteristics of said call, which of said preferred and alternate communications facility is best suited to carry said call;

examining the availability of said preferred and alternate communications channels; and preferentially routing said call over said preferred communications channel, when said channel is available, unless said call is best carried over said alternate communications channel wherein the alternate communications channel provides local service via a Local Exchange Carrier central office and wherein a call initiated at the subscriber station set to a called party served by the Local Exchange Carrier central office is routed over the alternate communications channel.

2. The method according to claim 1 wherein the characteristics of the call are examined to determine whether the call is an Inter-Exchange call, and if so, then routing the call over the preferred communications channel.

3. The method according to claim 1 wherein the characteristic of the call is examined to determine whether the call is a data call requiring high bandwidth, and if so, then routing the call over the preferred communications channel.

4. The method according to claim 1 wherein the preferred communications channel provides service via a cable television network.

5. A telephone network for providing substantially uninterrupted telecommunications service to and from a station set, comprising:

a first telecommunications facility including a cable television head end;

a preferred communications channel of a first type for coupling said telecommunications facility to the station set;

an alternate communications channel of a second type having different transmission characteristics for coupling the station set to the telecommunications facility, first intelligent switching means associated with said station set for examining characteristics of a call initiated at said station set and for examining the availability of said preferred and alternate communications channels and preferentially routing said call from said station set to the first telecommunications facility over said preferred communications channel unless said call is best carried over said alternate communications channel; and second intelligent switching means associated with said first telecommunications facility for examining characteristics of a call at said facility and destined for said station set and for examining the availability of said preferred and alternate communications channels and preferentially routing said call from the first telecommunications facility to said station set over said preferred communications channel unless said call is best carried over said alternate communications channel.

6. The network according to claim 5 wherein the preferred communications channel comprises a cable coaxial cable network.

7. The network according to claim 5 wherein the alternate communications channel a metallic wire pair linking the subscriber station set to a Local Exchange Carrier network central office that is coupled to the first telecommunications facility.

8. The network according to claim 5 wherein the alternate communications channel comprises a wireless channel established between a transceiver coupled to the first intelligent switching means and a wireless central office coupled to the first telecommunications facility.

* * * * *